United States Patent Office 2,868,799
Patented Jan. 13, 1959

2,868,799

CERTAIN SUBSTITUTED BIS-ANTHRAQUINONYL BIBENZOTHIAZOLE AND BIBENZOXAZOLE DYES AND PROCESS

Rütger Neeff, Leverkusen-Bayerwerk, Germany, assignor to Farbenfabriken Bayer Aktiengesellschaft, Leverkusen, Germany, a corporation of Germany No Drawing. Application September 5, 1956
Serial No. 607,998

Claims priority, application Germany September 7, 1955

5 Claims. (Cl. 260—303)

This invention relates to vat dyestuffs and to a process for producing the same.

It is an object of the present invention to provide novel vat dyestuffs. A further object is to provide vat dyestuffs which exhibit good fastness properties and especially a great strength of color. Further objects will appear hereinafter.

It has been found that new vat dyestuffs of the thiazole and oxazole series are obtainable by converting 1-amino-anthraquinone-2-aldehydes or their aniles substituted in the anthraquinone nucleus with o-amino-phenols or o-amino-thiophenols into the corresponding o-hydroxy- or o-mercapto-azomethines, and subsequently subjecting them to a dehydro-cyclization with oxidizing compounds, if desired, in the presence of alkaline agents, or by converting the 1-amino-anthraquinone-2-aldehydes or their aniles with aromatic amines into the corresponding azomethines and by treating these with sulfur, if desired, in the presence of a diluent such as naphthalene at elevated temperatures.

Substituted anthraquinones which are suitable for the process of the present invention are, for example, the 6-chloro-, 7-chloro-, 6,7-dichloro- and 6(7)-chloro-1-amino-anthraquinone-2-aldehydes or the 4-acylamino- or 5-acylamino derivatives of the 4- or 5-amino derivatives which may subsequently be acylated.

Examples of suitable o-amino-phenols or o-amino-thiophenols are p- and o-toluidine, benzidine, naphthylamine, p-phenylene-diamine, 1-hydroxy- or 1-mercapto-naphthyl-amine, o-aminophenol, o-aminothiophenol, o,o'-dihydroxy- and o,o'-dimercapto-benzidine or o-hydroxy- or o-mercaptoamino-anthraquinone. Instead of the o-amino-thiophenols there may also be used their dithiosulfoxides obtained as preliminary products in the Herz chlorine-sulfur reaction (cf. e. g. German patent specifications 360,690, and 367,346) with aromatic amines.

For the dehydrocyclization with oxidizing agents nitrobenzene is particularly suitable, if desired, in the presence of alkaline agents such as potassium acetate or potassium carbonate. Preferably the reaction is carried out within a temperature range of about 150–215° C. (see also German patent specification 366,272).

It is of special importance that it is not necessary to use for the process according to the present invention the substituted free anthraquinone aldehydes obtainable only with difficulty, but that it is possible to start from the corresponding aldehyde-aniles which are readily obtainable by reacting the nuclearly substituted 1-amino-2-methyl-anthraquinones with aniline in the presence of alkali and nitrobenzene at elevated temperature (see for example U. S. patent application Ser. No. 432,915, filed May 27, 1954).

The reaction of the aniles with the aromatic amino compounds is advantageously carried out in suitable solvents, such as glacial acetic acid or mixtures of glacial acetic with other inert diluents such as chlorobenzene, or nitrobenzene and at elevated temperatures, for example within the range of about 80–200° C., preferably 100–150° C.

The dyestuffs obtainable by the process of the present invention are distinguished by their especially valuable shades and fastness properties and great strength of color. The following examples are given for the purpose of illustrating the invention.

Example 1

A mixture consisting of 20 parts of 1-amino-4-benzoyl-amino-anthraquinone-2-aldehyde-anile, 160 parts of naphthalene, 30 parts of sulfur and 0.6 part of iodine is heated to 220° C. for 5 to 6 hours and then diluted with 150 parts of toluene. After cooling, the product is filtered off by suction and is freed in conventional manner from adhering naphthalene and by boiling out with sodium sulphide from excess sulfur. The new dyestuff, which is presumed to have the following formula

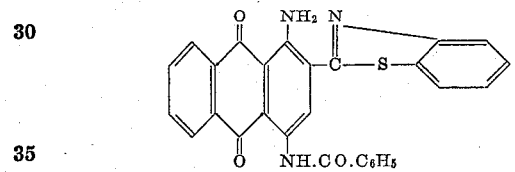

dissolves in concentrated sulfuric acid with an olive color. Upon addition of paraformaldehyde, the solution turns blue when cooled, and changes to bright violet when heated. Cotton is dyed from a cold, reddish violet vat in greyish blue shades fast to chlorine and having good fastness properties.

The 1 - amino - 4 - benzoylamino-anthraquinone-2-aldehydeanile was obtained as follows:

50 parts of 1-amino-2-methyl-4-benzoylamino-anthraquinone, 25 parts of potassium carbonate and 10 parts of aniline are refluxed in 300 parts of nitrobenzene until a sample dissolves in pyridine with a clear blue color. The reaction mixture is filtered while hot. Upon cooling the 1-amino-4-benzoylamino-anthraquinone-2-aldehyde - anile crystallizes from the filtrate in dark blue prisms.

Example 2

15 parts of 1-amino-4-benzoylamino-anthraquinone-2-aldehyde-anile are heated to the boil with 3.6 parts of 3.3'-dihydroxy-benzidine in 300 parts of glacial acetic acid for 2 hours. The azomethine thus obtained crystallizes in blue needles; its constitution may be illustrated by the following formula

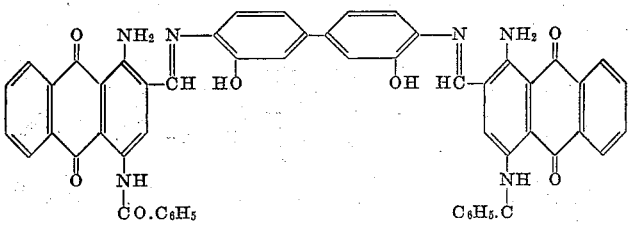

It is then filtered off by suction and washed with water. The solution of the product in concentrated sulfuric acid is reddish orange. Upon addition of paraformaldehyde the color turns green when cooled, and to red-violet when heated. When using hydrosulphite, an olive vat is obtained.

14 parts of the above azomethine are heated with 7 parts of potassium acetate and 250 parts of nitrobenzene to 210° C. until a sample shows under the microscope instead of the blue needles of the azomethine only small grey needles. The oxazole thus obtained having the formula

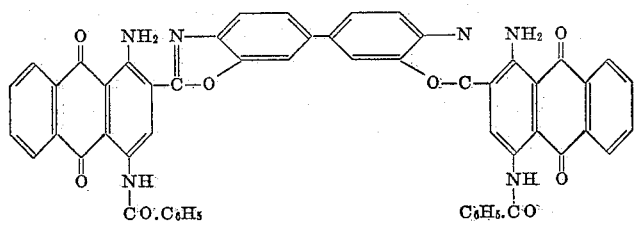

is filtered off by suction at about 90° C. washed with a little nitrobenzene and freed from the solvent in conventional manner. The dyestuff obtained dissolves in concentrated sulfuric acid with a brownish yellow color.

Upon the addition of paraformaldehyde the color of the solution turns to a bluish green when cooled, to a bluish red when heated. The product dyes cotton from a ruby-colored vat in bluish-grey shades fast to chlorine and having very good general fastness properties.

In a similar manner a more greenish blue-grey may be obtained from 1-amino-4-p-methoxy-benzoylamino-anthraquinone-2-aldehyde-anile. When using 1-amino-5-benzoyl-amino-anthraquinone-2-aldehyde-anile a bluish violet dyestuff is obtained.

*Example 3*

A mixture of 7.43 parts of 1-amino-4-benzoylamino-anthraquinone-2-aldehyde-anile, 4.89 parts of 1-amino-athraquinone-2-aldehyde-anile and 3.27 parts of 3,3'-dihydroxy-benzidine is heated to the boil in 300 parts of glacial acetic acid for 2 hours. The reddish blue crystals of the condensation product are filtered off by suction and washed with water.

The solution of the azomethine presumably possessing the following constitution

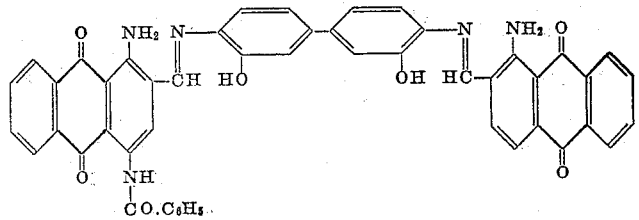

is orange-red in concentrated sulfuric acid and turns green upon cooling and addition of paraformaldehyde, and bluish-violet on heating. The color of the vat is brown-yellow.

11.4 parts of the said azomethine are heated to the boil with 5.7 parts of potassium acetate in 150 parts of nitrobenzene until the dehydrogenation product is completely crystalline with small greyish violet needles. The oxazole is isolated in conventional manner and possesses presumably the following constitution

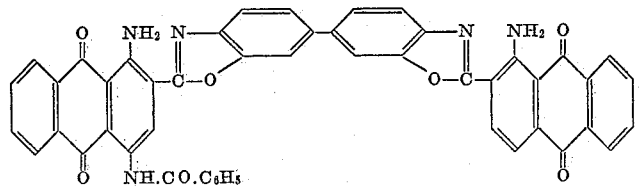

It dissolves in concentrated sulfuric acid with a brownish yellow color which turns to a bluish green upon the addition of paraformaldehyde and cooling and to violet on heating. Cotton is dyed from a ruby-colored vat in bluish currant shades of very good fastness properties.

If in the example 1-amino-4-benzoyl-amino-anthraquinone-2-aldehyde-anile is replaced by the corresponding 5-benzoyl-amino derivative, a product is obtained dyeing bluish red shades.

*Example 4*

A mixture of 7 parts of 1-amino-4-benzoylamino-anthraquinone-2-aldehyde-anile, 1.95 parts of 85 percent 3,3'-dimercapto-benzine and 100 parts of glacial acetic acid is heated to the boil of 2 hours, whereupon the precipitate is filtered off by suction and freed from the glacial acetic acid. The azomethine thus obtained is then heated directly to the boil with 3 parts of potassium acetate in 80 parts of nitrobenzene until the thiazole having presumedly the following formula

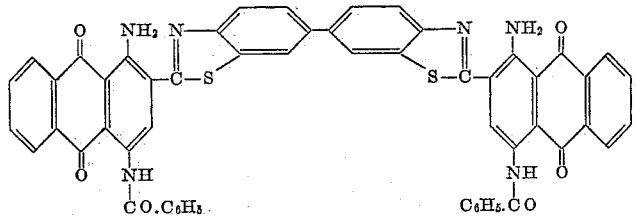

is completely crystallized in small greyish blue needles. The color of the solution of the isolated product is brownish yellow in concentrated sulfuric acid. Upon the addition of paraformaldehyde it turns to green when cooled and to bluish red when heated. The dyestuff dyes cotton

Example 5

If a molar mixture of 1-amino-4-benzoylamino-anthraquinone-2-aldehyde-anile, 1-amino-anthraquinone-2-aldehyde-anile and 3,3'-dimercapto-benzidine is condensed and subsequently dehydrogenated in nitrobenzene, a dyestuff is obtained which has presumably the following constitution

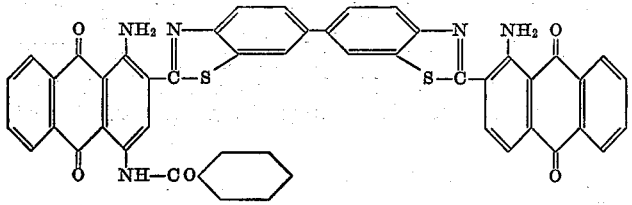

It dyes cotton from a violet vat in currant shades.

Example 6

A mixture of 5.1 parts of 1-mercapto-2-amino-anthraquinone and 8.9 parts of 1-amino-4-benzoylamino-anthraquinone-2-aldehyde-anile is condensed by heating in 250 parts of glacial acetic acid yielding the violet crystals of azomethine having the formula

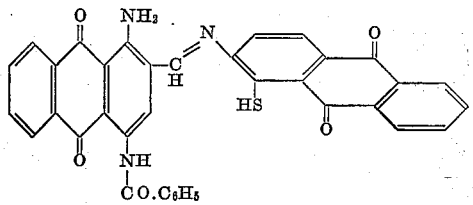

The azomethine dissolves in concentrated sulfuric acid with a blue color which turns to greyish green upon cooling and addition of paraformaldehyde, upon heating to violet. Cotton is dyed in reddish blue shades which change to green when treated with a soda solution, and to bluish green with chlorine water.

If 7 parts of the azomethine in 100 parts of nitrobenzene are heated to the boil, dehydration of the thiazole sets in rapidly which crystallizes in bluish green small needles and has the formula

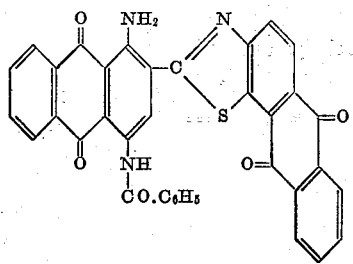

The thiazole dissolves in concentrated sulfuric acid with a yellowish green color which turns to bluish green upon cooling and addition of paraformaldehyde and to violet upon heating. The product dyes cotton from reddish violet vat in bluish green shades fast to chlorine and having an excellent fastness to light and very good general fastness properties.

The same dyestuff may be obtained by a more simple method by heating to the boil 5.1 parts of 1-mercapto-2-amino-anthraquinone and 8.9 parts of 1-amino-4-benzoyl-amino-anthraquinone-2-aldehyde-anile in 150 parts of nitrobenzene until formation of the small bluish green needles is terminated.

If instead of 1-amino-4-benzoyl-amino-anthraquinone-2-aldehyde-anile, the derivative of 5-benzoylamino is used, a dyestuff is obtained dyeing claret shades.

Example 7

14.5 parts of 6-chloro-1-amino-anthraquinone-2-aldehyde and 6.25 parts of o,o'-dimercapto benzidine are heated to the boil in 200 parts of nitro benzene until the formation of the condensation product of the formula

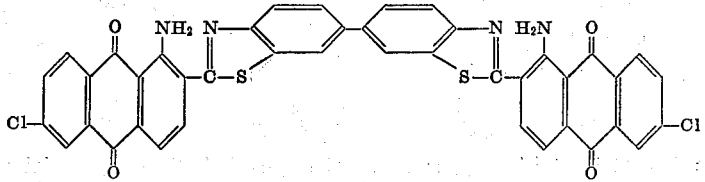

is completed. The dyestuff forms blue red needles and is isolated in known manner. It dyes cotton from a ruby colored vat is a bluish bordeaux shade. The fastness properties, especially the fastness to light, are better than those which are obtained by using the chlorine free dyestuff (see German patent specification 366,272, Example 1).

Example 8

12 parts of 1-amino-4-(p-chloro-benzoylamino)-anthraquinone-2-aldehyde-anile and 6 parts of 2-amino-3-hydroxy-anthraquinone are heated in 180 parts of nitrobenzene and 25 parts of glacial acetic acid to 120° C. until a worked up sample shows only the bluish violet crystallizing condensation product of the formula

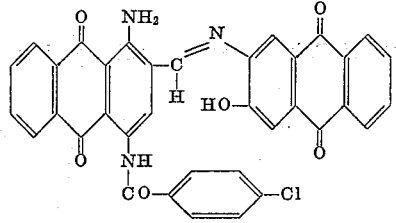

The glacial acetic acid is now distilled off by heating the melt to 200° C., then 7 parts of potassium acetate are added and the melt is boiled for several hours until the dehydrocyclisation is terminated. The dyestuff thus obtained of the formula

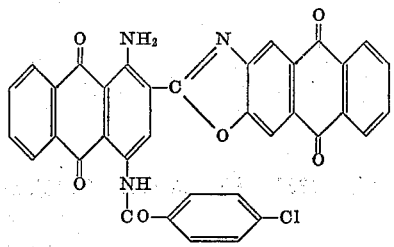

crystallizes in blue needles and dyes cotton from a bluish violet vat in a reddish-blue shade which exhibits excellent fastness properties.

The 1-amino-4-(p-chloro-benzoylamino)-anthraquinone-2-aldehyde-anile was obtained as follows:

50 parts of 1-amino-2-methyl-4-(p-chloro-benzoyl-amino)-anthraquinone, 25 parts of potassium carbonate and 10 parts of aniline are refluxed in 300 parts of nitrobenzene until a sample dissolves in pyridine with a clear blue color. The reaction mixture is filtered while hot. Upon cooling the 1-amino-4-(p-chloro-benzoylamino)-anthraquinone-2-aldehyde-anile crystallizes from the filtrate in blue prisms.

Example 9

A mixture of 11.7 parts of 1-amino-4-β-naphthoyl-amino-anthraquinone-2-aldehyde-anile, 2.92 parts of 3,3'-dimercapto-benzidine (containing 85% of the pure compound) and 100 parts of glacial acetic acid are heated to the boil for about 2 hours. Thereafter the reaction product is filtered off and heated with 4.5 parts of potassium acetate in 120 parts of nitrobenzene to the boil until the dyestuff of the formula

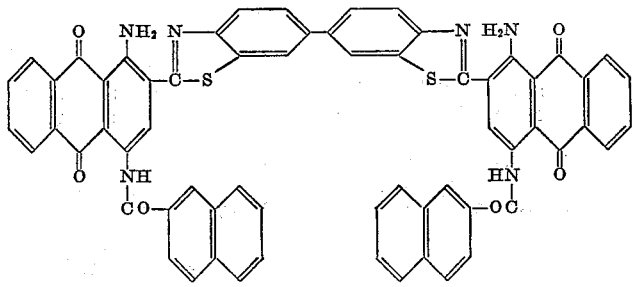

is formed in bluish grey needles. The dyestuff is then filtered off and dissolves in concentrated sulfuric acid with a brownish-yellow color. It dyes cotton from a warm blue violet vat in clear grey shades of good fastness properties.

Example 10

0.2 part of the dyestuff described in Example 4 are dissolved at 50° C. in 200 parts by volume of an aqueous solution containing 1.4 parts by volume of sodium hydroxide solution (38° Bé.), 0.8 part of sodium hydrosulfite and 4 parts of sodium sulfate. From this dye bath cotton is dyed for about 45 minutes at 50° C. The dyeing is oxidized in the usual manner on the air and thereafter rinsed and washed with water containing 4 parts of acetic acid per liter. The dyeing is then soaped, rinsed and dried in the usual manner. A bluish grey dyeing is obtained which exhibits good fastness properties.

I claim:

1. A process for the manufacture of vat dyestuffs which comprises reacting a member selected from the group consisting of 1-amino-anthraquinone-2-aldehydes and aniles thereof, which are substituted in the anthraquinone nucleus by at least one member selected from the group consisting of chlorine and acylamino groups at a temperature within the range of 80–200° C. in an organic solvent selected from the group consisting of glacial acetic acid and mixtures of glacial acetic acid and inert organic diluents with a member selected from the group consisting of o,o'-dihydroxy-benzidine and o,o'-dimercapto-benzidine and subjecting the reaction product obtained to a dehydrogenating cyclization with nitrobenzene at a temperature within the range of 150–215° C. and recovering the reaction product formed.

2. As novel dyestuff

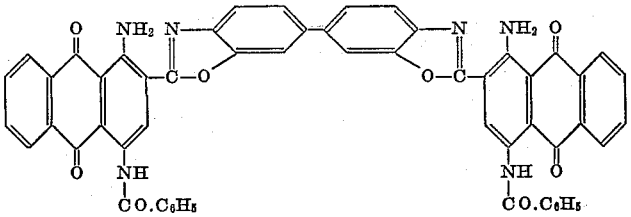

3. As novel dyestuff

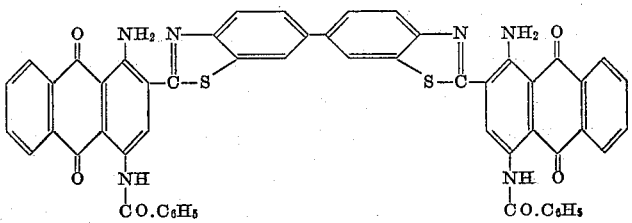

4. As novel dyestuff

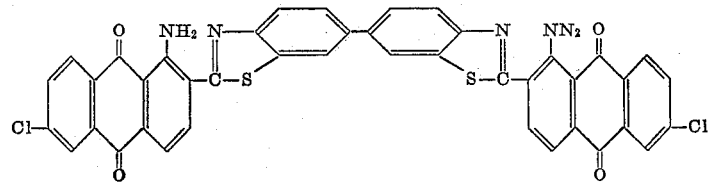

5. A novel dyestuff of the formula

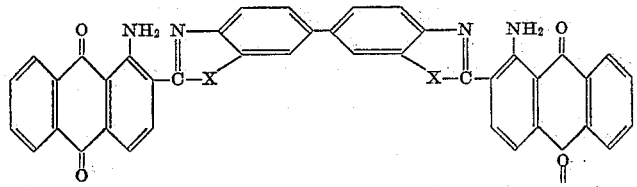

wherein X is a member selected from the group consisting of oxygen and sulfur and wherein at least on anthraquinone molecule is substituted at least once by a member selected from the group consisting of chlorine and acrylamino groups.

References Cited in the file of this patent

UNITED STATES PATENTS 2,099,673  Beard ------------------ Nov. 23, 1937
2,453,410  Cullinan et al. ------------ Nov. 9, 1948

OTHER REFERENCES

Bogert et al.: Beilstein (Handbuch der org. Chem., 4th ed., 1st sup.), vol. 27, page 213 (1938).